United States Patent Office 3,248,237
Patented Apr. 26, 1966

3,248,237
COMPOSITIONS OF MATTER CONTAINING
ORGANIC SILICATES
Helmut Hans Wilhelm Weldes, Havertown, Pa., and Mahlon Robert Derolf, Blackwood, N.J., assignors to Philadelphia Quartz Company, Philadelphia, Pa., a corporation of Pennsylvania
No Drawing. Filed Sept. 20, 1962, Ser. No. 225,111
17 Claims. (Cl. 106—38.35)

INTRODUCTION

This is a continuation-in-part of copending application Serial No. 131,490, filed August 15, 1961, and application Serial No. 50,877 filed August 22, 1960.

This invention *generally relates* to new compositions of matter which are useful for refractory coatings, rapid-setting cements, adhesives and the like. *More specifically* we have found new compositions of the above nature which have superior characteristics wherein water and heat resistance are important.

BACKGROUND

In investment casting processes *the binder component* for the sand or other refractory particulate material *may consist of* sodium silicate, ethyl silicate, silica sol, organic resin or gypsum. Each of these binder components has certain advantages and disadvantages, depending upon the way in which it is used and the conditions under which it is used. A more generally applicable binder component requiring simplified procedures has been sought by those in the art.

*Sodium silicate,* while economical and easy to use, is disadvantageous that it (a) contains alkali metal ions which flux at high temperatures, (b) is water-soluble to an extent which often weakens the bond even at a high silica content and (c) tends to cause variations in the electrical properties. Sodium silicate has the further disadvantage that it forms a very strong mold with little or no "shake-out" ("shake-out" being the ease of disintegration of the refractory mold after casting) which is especially disadvantageous in the case of intricate or delicate parts.

*Ethyl silicate* on the other hand does avoid the problem of alkali metal ions, but it is expensive and has the further drawback in that it is used in the form of an acidified sol in an organic solvent (which can cause undesirable fire, explosion and health hazards). Furthermore, the acidified hydrolyzed ethyl silicate binder must be prepared at the plant and not only tends to be variable in its properties, but also becomes unstable in use with the result that large quantities are wasted.

The *silica sols* are also expensive and while they have little or no alkali metal ion they do either require an added setting agent, or must be used in conjunction with the ethyl silicate solution mentioned above. They are unstable and often variable in characteristics and can be used only a short time before being wasted. Furthermore, they break and separate the silica irreversibly when frozen or when in contact with added salts.

The *resins,* such as phenolformaldehyde, are expensive and require added agents to bring about setting and such agents lead to difficult control problems. Resins do have the advantage that they burn out at high temperatures and thus overcome the shake-out problem but the vapors are acidic and toxic, and protective provision must be made to take care of these drawbacks.

*Gypsum* has different problems but perhaps the chief one is its failure at high temperatures so that it cannot be used with high temperature metals and alloys.

THE INVENTION BROADLY

In accordance with this invention we have succeeded in developing novel compositions useful for investment casting molds as well as coatings, adhesives and cements. These novel compositions give excellent castings with a very good reproduction of very intricate pieces and dimensional tolerances which are much better than the standard limits for this process. The standard limits are about ±0.005 inch, whereas we have produced castings with a tolerance of ±0.002 to ±0.003, or even better. Our compositions are especially useful in the precoating of investment casting patterns.

OUR NOVEL COMPOSITIONS—IN GENERAL

Our novel compositions, in accordance with this invention, comprise a combination of
 (a) A particulate material, and
 (b) A binder component comprising a substantially aklali metal-free organic silicate.

THE PARTICULATE MATERIAL

The particulate material used in the compositions in accordance with this invention may be particles composed of silicas, aluminas, zirconias and zircon, titania, carbon, silicon carbide, molybdenum disilicide, boron nitride, beryl, olivine, wollastonite, asbestos, fluorspar, amblygonite, nepheline syenite, cellulose, natural and synthetic resins and elastomers, silicate and other glasses, etc. The patriculate material may also comprise fibers of the above materials.

THE BINDER COMPONENT—GENERAL FORMULAS AND SPECIFIC COMPOUNDS

It is believed that the organic silicate binder components which are useful in connection with this invention can be broadly characterized by the formula:

$$X(N_nR_p{}^s)_2O \cdot YSiO_2 \cdot ZH_2O$$

wherein:

N represents a nitrogen atom;
$n$ is a small integer, less than 10 and preferably less than five;
X, Y and Z represent numbers defining the relative amounts of each of the component parts of the compound. X is 1, Y is preferably between 0.5 and 20, and Z is preferably between 0 and 99;
R represents alkyl radicals containing between about 1 and 20 carbon atoms, at least two of which are omega hydroxy alkyl groups (preferably two or more of these R groups are ethanol groups and the others derivatives of ethanol groups), up to four groups are associated with each N;
$p$ is at least 4, indicating total R groups; and
$s$ is an integer from 1 to $p$, indicating the number of different types of R groups.

In a more specific sense, it is believed that the organic silicate binder components useful in connection with this invention can be characterized by the formula:

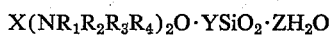
$$X(NR_1R_2R_3R_4)_2O \cdot YSiO_2 \cdot ZH_2O$$

wherein N, X, Y and Z have the significances noted above and $R_1$, $R_2$, $R_3$ and $R_4$ represent alkanol radicals containing between about 1 and 20 carbon atoms.

Preferred specific examples of organic silicates useful in accordance with this invention would include sodium-free tetraethanolammonium silicate, tetraethanol piperazinium silicate, diethanol morpholinium silicate and hexa-ethanolethylene diammonium silicate.

PREPARATION OF BINDER COMPONENTS

The binder components of this invention may be prepared in a number of ways. Such methods include, for example:

(a) Removing the alkali metal ion from alkali metal organic ammonium silicates by use of a suitable base exchange resin;

(b) Dissolving sodium-free silica in sodium-free hydroxalated organic ammonium silicates;

(c) Dissolving sodium-free silica in sodium-free tetraethanolammonium silicate solutions;

(d) The sodium may be leached from the less soluble sodium quaternary ammonium silicate crystals;

(e) Reacting ammonia and ethylene oxide with finely divided silica hydrate or silica gel, or a colloidal silica sol.

CONCENTRATION AND $SiO_2$ CONTENT OF BINDER COMPONENTS

Aqueous solutions of binder components may be prepared with mol ratios of silica to organic alkali ion as high as 20, or even greater, and containing 50% or more of $SiO_2$, whereas even concentrated commercial silica sols generally contain only 30% $SiO_2$. The upper limit of concentration depends on the consistency of the final mixture desired and, when modified, by the limits at which precipitation or gelation may occur.

INFLUENCE OF pH ON BINDER COMPONENTS

Our new organic silicate binder components may be used either at an acid or an alkaline pH, but in general the alkaline solutions prepared according to our hereinafter specified methods are preferred. Acidic solutions give fine, hard, smooth castings to which there is no objection but acidic solutions do have a maximum life of only about 40 hours, whereas alkaline solutions may be prepared having an indefinite life above a pH of about 9.7 or 9.8. Useful sols on the acid side have a preferred range from about 0.2 to 2.0 pH, whereas on the alkaline side they range from about 9.7 to 10.8 pH with the preferred range being about 9.8 to 10.3. The bond for the normal partially neutralized alkaline solution is softer than that prepared with the acid solution and it is not completely water-resistant. A soft bond tends to permit buckling when fired at high temperatures. Solutions of our organic silicates in a normal unneutralized condition are effective binders but the bond lacks water resistance before firing.

However, according to our preferred method, we have found that a water solution of an alkali metal-free organic silicate with a ratio of 9.3 $SiO_2$ to quaternary ion (such as tetraethanolammonium silicate which may have a pH of about 10.8) may be "prepolymerized." The pH may be reduced to about 9.6 by the addition of sufficient mineral acid to reduce the pH by 1.20 units. On aging over-night or warming for a short period, the pH will again rise to about 10.42 and a further reduction of 0.13 pH units produces a solution having a final and nearly constant pH of about 10.29. If this sequential addition of increments of acid is not carried out, an initial reduction to a pH of about 9.6 will result in a solution having a final pH of about 10.4 when the solution is used. This higher pH accounts for the soft bond in the final cement. If, on the other hand, the pH of the initial water solution is reduced by 1.2 pH units, as indicated above, aged for several hours, and then reduced further by 0.13 pH units, the pH will remain nearly constant. If desired, the pH may be reduced slightly by a further addition of acid. Such solutions remain stable in pH and provide excellent molds for investment casting. They also produce excellent water-resistant ceramic coatings, such as those used for roofing granules.

With varying ratios of $SiO_2$ to quaternary ion the first incremental pH change varies about as follows. With a ratio of 2.7 the first incremental change should be about 0.9 pH units. At a ratio of 5.4 the first incremental change should be about 1.4 pH units. As stated above, at a ratio of about 9.3 the incremental change should be 1.2 units, and at a ratio of 15 it should again be about 0.9 unit. Thus the preferred initial pH change passes through a maximum. At the low ratios it is controlled by the high salt content, while at the high ratios it is controlled by the silica content. The more alkaline ratios have initially a much higher pH as shown in the following table:

| Ratio, $SiO_2$/quaternary ion | Percent $SiO_2$ | pH |
|---|---|---|
| 0.53 | 30.0 | 13.1 |
| 1.3 | 30.0 | 13.3 |
| 2.7 | 35.8 | 12.2 |
|  | 31.5 | 11.8 |
| 4.8 | 46.9 | 11.5 |
|  | 41.0 | 11.4 |
| 9.4 | 44.2 | 11.1 |
| 15.0 | 36.4 | 10.0 |

COMPATIBILITY OF BINDER COMPONENTS WITH SOLVENTS

The organic silicate binder components of this invention (and particularly the quaternary ammonium silicates) are compatible with many water miscible organic solvents. A comparison of the compatibility of a silica sol (Ludox HS, from the du Pont de Neumours Chemical Co.) and high ratio tetraethanol-ammonium silicate with various organic solvents is set forth in the table below:

MAXIMUM AMOUNT OF SOLVENT IN MIXTURES STABLE FROM 1° C TO 60° C (PERCENT)

|  | High ratio TEA silicate | | | Ludox HS | |
|---|---|---|---|---|---|
|  | 50% $SiO_2$ | 30% $SiO_2$ | 15% $SiO_2$ | 30% $SiO_2$ | 15% $SiO_2$ |
| Methanol | 37.5 | 50.0 | 61.5 | 37.5 | |
| Ethanol | 28.6 | 44.5 | 54.5 | 16.7 | 37.5 |
| Iso-propanol | 23.1 | 37.5 | 54.5 | 16.7 | 16.7 |
| Acetone | 23.1 | 37.5 | 44.5 | 16.72 | 37.5 |
| Dioxan | 16.7 | 28.6 | 28.6 | <16.7 | 61.5 |
| Tetrahydrofuran | 16.7 | 37.5 | 44.5 | 16.7 | 28.5 |

UTILITY OF BINDER COMPONENTS

The binder components of this invention, as well as solutions thereof are useful as adhesives, cold welding agents, or cements, and will find application in molded products and coatings. As used in this application, the expression "Composition" or "novel compositions" primarily includes inorganic compositions, such as enamels, paints, refractory films, molded products and cements. As discussed in the following examples, our novel compositions are useful for molds and cores for casting metal and the like wherein the binder components may be used in the primary investment or dip-coat to hold a fine sand facing at an interface with a wax or plastic mold, or in the formation of shell molds by multiple dips or spray coating. Similarly, our novel compositions may be used in the secondary or backup investment to bond the main mass of refractory particles in the mold, and also in the preparation of standard "green" and baked molds. Our novel compositions have application in many other molded products, such as in cores for the above molds, electrical resistors, magnets, molded shapes and tubes, insulation (including foamed materials), partially metallic structures, bricks, tiles, briquets, wall panels, catalysts, particle boards (both organic and inorganic), paper and felted products. Coatings include the primary investment coating mentioned above as well as enamels, including cold enamels and overglazes, paints both for ordinary and high temperature use, other refractory films, corrosion-resistant films, electrically resistant films, coatings on roofing granules and shingles, hardening and weatherproofing treatments for stone, sealing for metals such as anodized aluminum, fountain solutions for planograph printing, sizing of threads as well as fabric finishing, and tanning operations. Thus our novel composition and binder components may be used generally where its properties are advantageous.

ADVANTAGES OF THE NEW BINDER COMPONENTS OVER THOSE NOW IN USE

The binder components of this invention offer important advantages over those binder components (such as organic silicate esters and silica sols) which are now being used by those in the art. The most striking advantages can be summarized as follows:

(a) Alkaline binder solutions in accordance with this invention are delivered ready to use. No pH or concentration adjustments are necessary.

(b) Our ready-to-use binder solutions are indefinitely stable when well mixed. They are not affected by freezing or heating to temperatures up to about 150° F. if stored in closed containers. If heated to a sufficiently high temperature, our binder components leave a residual bond of only $SiO_2$.

(c) They contain no organic solvents, so there are no fire or vapor hazards.

(d) Slurries of particulate materials prepared with our novel binder components are indefinitely stable if agitated properly and kept closed when not in use. This is a very important property since all other binder components in use today have only a very limited useful life when adjusted and mixed with sand to make a slurry. Thus, all slurries prepared with competitive sols have to be discarded after one or two days, which often results in a waste of about 90% of the material, whereas the slurries prepared with our alkaline binder solutions are indefinitely stable and only the amount which is used up by dipping has to be replenished every day. This allows 100% use.

(e) The slurries prepared with our organic silicate binder components can be adjusted to higher viscosities resulting in heavier coatings and still giving excellent reproduction and detail of the pattern. Pieces of very different shape can be coated with a slurry of only one viscosity. In contrast, for prior art slurries a special viscosity adjustment is needed for each individual shape or pattern.

(f) The drying time between dippings is only 2–4 hours at temperatures of 70–78° F. Conventional coatings have to be dried at these temperatures for 8–24 hours.

(g) Only two coatings are needed for the same pieces which require three or more coatings with the competitive binders. Only one coating is sufficient in some cases.

Examples in general

In describing the preparation and illustrating the use of our new compositions and binder components we will primarily refer to the use of the "lost wax" process of forming metal castings both by the solid and shell investment processes. In the investment casting process a pattern is first formed from a special wax or a plastic material which will give a hard, smooth surface. The wax is sometimes recovered but the plastic is usually considered expendable. When a wax pattern is used, it is dipped in a precoat slurry comprising a binder component and a refractory powder such as fine sand, alumina, zirconia or the like. The pattern which has been thus wetted with the precoat solution is then further coated with sand, alumina, or the like by hand sifting or by dipping the wetted pattern in a bed of fluidized dry sand and then the thickly coated pattern can be dried. This alternate dipping and coating process may be repeated one or more times. This precoat is referred to as the "primary investment." In the preferred preparation of shell molds by the present invention, the dipping and sanding may be repeated as often as necessary to build up a thick, strong shell.

The completed primary investment is backed up with a secondary investment which may contain the same or a different binder mixed with coarser refractory material or filler. The binder component for this secondary coating is often sodium silicate or monomagnesium acid phosphate.

The completed mold is next preliminarily dried and then heated carefully to remove the wax by melting and then the resulting hollow mold is finished by heating to at least the temperature of the molten metal for which it is designed. The metal is then cast into the mold and cooled and the mold then removed.

Example 1

A series of tests were made to show how the compressive strength of molded blocks of sand (i.e., blocks made from a combination of sand and a binder solution) could be varied depending upon the amount and properties of the sodium-free tetraethanolammonium silicate used in the binder solution. In these tests four different sodium-free tetraethanolammonium silicates were used and their properties can be summarized as follows:

| Identifying symbol for sodium-free tetraethanolammonium silicate | $SiO_2$, percent | Quaternary ion, percent | Mol ratio of $SiO_2$/quaternary ion |
|---|---|---|---|
| A | 42.08 | 49.59 | 2.74 |
| B | 50.27 | 29.89 | 5.44 |
| C | 73.70 | 25.36 | 9.42 |
| D | 30.01 | 10.05 | 9.65 |

The sand used for the molded blocks was "Berkeley Dry Float Sand." This is a quartz sand having a mesh size range as follows:

Mesh: Percent
+48 _____ 1.9
−48+100 _____ 27.4
−100+200 _____ 43.0
−200+325 _____ 21.6
−325 _____ 6.1

In Table I below the differences in the shrinkage and compressive strength values of molded blocks of sand are shown to vary a great deal depending upon the amount of $SiO_2$ in the binder solution, the pH of the binder, the gel time of the binder and sand mixture and the sand to binder ratio.

With regard to silicates A, B and C, they were dissolved in water and a sufficient amount of sulfuric acid was added to form (in each case) an acid sol with a gel time of 60 minutes. The resulting binder solutions had the pH values set forth in Table I. The binder solutions so prepared were then mixed with stand, the objective being to obtain a workable mixture having a sand to binder ratio of 1.67. (In several instances in the table it will be noted that the sand to binder solution ratio had to be either increased or decreased in order to end up with a workable slurry.)

With regard to silicate D, only sufficient 30% $H_2SO_4$ was added to give a pH of 9.78, which resulted in the formation of an alkaline sol.

Each mixture of sand and binder solution, after troweling for 5 minutes, was used to fill a set of 9 Teflon molds which were one-inch high cylinders of one-inch diameter. Three of the set of 9 molds were cured at room temperature for 25 hours, 3 others were heated at 60° C. for two hours and the remaining 3 at 60° C. for two hours followed by firing at 927° C. for one hour.

In general, we have found that the weight ratio of refractory particles to binder solution may vary from about 0.5 to 3.5. When the ratio of refractory particles is higher the bond becomes weaker, and when the ratio is lower, shrinkage is higher. The best ratio to use will depend on the specific characteristics of the refractory material and of the binder solution.

TABLE I

| Silicate | Percent SiO2 in binder solution | pH of binder | Gel time of binder and sand mixture in mins. | Sand: binder solution wt. ratio | Shrinkage | Compressive strength of molded block in p.s.i. Curing temperature | | |
|---|---|---|---|---|---|---|---|---|
| | | | | | | Room temp. | 60° C. | 60° C.+927° C. |
| A | 12 | 4.40 | 108 | 1.67 | Little | 12.3 | 8.3 | 3.5 |
| A | 20 | 3.95 | 44 | 1.67 | Very little | 40.7 | 42.8 | 6.3 |
| B | 12 | 4.00 | 92 | 1.67 | Little | 13.7 | 4.0 | 3.6 |
| B | 20 | 3.55 | 190 | 1.67 | ---do--- | 37.6 | 9.2 | 9.4 |
| C | 3 | 5.47 | 62 | 2.61 | Very little | 2.5 | 2.1 | -------- |
| C | 12 | 4.20 | 104 | 1.67 | ---do--- | 16.5 | 10.6 | 16.9 |
| C | 20 | 3.85 | 56 | 1.67 | ---do--- | 35.6 | 29.4 | 61.8 |
| C | 40 | 2.85 | 148 | 1.67 | None | 128.7 | 100.5 | 225.5 |
| C | 50 | 2.65 | 74 | 1.15 | ---do--- | 174.0 | 136.8 | 206.8 |
| C | 50 | 2.85 | ¹20 | 0.90 | ---do--- | 135.5 | 159.0 | 60.6 |
| C | 40 | 2.85 | 73 | 1.32 | Very little | 98.6 | 61.3 | 110.9 |
| C | 40 | 2.85 | 110 | 1.02 | ---do--- | 71.2 | 67.3 | 94.0 |
| C | 30 | 3.21 | 67 | 1.67 | Little | 78.1 | 44.0 | 44.0 |
| C | 20 | 3.85 | 56 | 1.67 | Very little | 35.6 | 29.4 | 61.8 |
| C | 12 | 4.20 | 104 | 1.67 | ---do--- | 16.5 | 10.6 | 16.9 |
| C | 3 | 5.47 | 62 | 2.61 | ---do--- | 2.5 | 2.1 | -------- |
| D | 23 | 9.78 | ²>16 | 2.11 | ---do--- | -------- | 70.8 | 99.1 |

¹ Time to soft gel. Other times to hard gel. ² Days.

(In the table above, the second column refers to the percent silica in the initial water solution. This is the binder solution and contains no sand. The fourth column refers to the gel time of the mixture of binder and sand.)

In order to compare the above mold blocks with the molded blocks made with binder solutions ordinarily used in investment casting, an ethyl silicate ester and a silica sol were obtained. The ethyl silicate ester (which contained 40% silica) was obtained from Union Carbide Corp. and was designated as "Ethyl Silicate 40." It had a specific gravity at 20/20° C. of 1.05 to 1.07 and a boiling range at 760 mm./Hg which averaged about 80° C. The silica sol, known as Syton 200, contained 30.2% of SiO2 and was obtained from Monsanto Chemical Co. It had a pH at 25° C. of 9.3 and a specific gravity at 25° C. of 1.20.

In preparing a molding from the "Ethyl Silicate 40," 99.6% of the Berkeley Dry Float Sand was rotated on a ball mill for two hours with 0.4% of magnesium oxide. A 30% SiO2 binder solution was prepared by mixing 106 ml. of the "Ethyl Silicate 40" with 30 ml. of ethyl alcohol and 14.4 ml. of 1% HCl. This binder solution was aged for two hours and then 7.6 ml. of water was added to give a gel time of 60 minutes. Immediately after adding the water, a mixture of 200 grams of the said sand-magnesium-oxide blend and 120 grams of the said binder solution was prepared, resulting in a sand:binder ratio of 1.67. Nine Teflon molds (of the type described above) were then filled with this sand and binder solution mixture. It formed a soft gel in 13 minutes, and the sand had set hard in 111 minutes. The molds were divided into three sets of three, as before. With 30% SiO2, a sand to binder ratio of 1.67 was satisfactory. However, at 20% SiO2 the ratio had to be 2.72 and at 12% SiO2 the ratio had to be 3.15 to give a castable consistency. All of the molded blocks were very powdery on the surface, and those fired at 927° C. cracked badly.

A 30% silica sol (Syton 200) will set by evaporation of water without any additive but, because of the slow-diffusion of the water, setting of a one-inch cube at room temperature in a Teflon mold requires a long period. Therefore, all molds made with this material were set by heating at 60° C. for 16.5 hours and half of these were then fired at 927° C. for one hour. A sand-binder ratio of 2.57 gave a workable consistency for all SiO2 concentrations in this binder solution. A parting agent of silicone grease was used on the mold surfaces.

TABLE II

| Binder component | SiO2, percent | pH | Sand: binder ratio | Appearance of sand mixture | Shrinkage | Compression strength in p.s.i. Curing temperature | | |
|---|---|---|---|---|---|---|---|---|
| | | | | | | Room temp. | 60° C. | 60°+927° C. |
| Ethyl silicate: | | | | | | | | |
| 40 | 30 | 1.20 | 1.66 | Castable | Very slight | 68.3 | 81.3 | 55.6 |
| 40 | 20 | 1.58 | 2.72 | ---do--- | ---do--- | 72.4 | 73.4 | 23.3 |
| 40 | 12 | 2.10 | 3.15 | ---do--- | ---do--- | 24.6 | 25.8 | 8.3 |
| Syton: | | | | | | | | |
| 200 | 30 | 8.90 | 2.57 | ---do--- | None | -------- | 49.5 | 107.3 |
| 200 | 20 | 9.0 | 2.57 | ---do--- | ---do--- | -------- | 15.3 | 15.7 |
| 200 | 12 | 9.2 | 2.57 | ---do--- | ---do--- | -------- | 4.5 | 25.4 |

The tests shown above indicate that the partially neutralized tetraethanolammonium silicate binder solutions of this invention give as good or better compressive strength than competitive binders and in addition our binder solutions are simpler to handle. Moldings prepared with our binder show very little shrinkage, are more stable against a shearing force and do not crack.

A Bausch and Lomb Spectronic 20 instrument using standard cell depths of 11.8 mm. showed that the transmittance of light at a wave length of 430 mμ was constant over a period of more than two weeks aging of the prepared alkaline binders and more than three or four months for solutions of the untreated organic alkali silicates. Other tests have shown these sodium free organic alkali silicates are stable for more than a year, the alkaline binder solutions prepared by triple adjustment are stable for over ten months and the primary investment sand slurries are stable and useful for over a month.

These alkaline binder solutions also withstood freezing at −22° C. through four cycles and, in the fifth cycle, the solution was kept frozen for six days. On melting and remixing, the transmittance was constant, showing that the solution was stable in spite of the freezing cycle. In comparison, a silica sol separated irreversibly in the first cycle of freezing.

*Example 2*

In another test a binder solution was prepared having 4610 parts by volume of tetraethanolammonium silicate solution containing 40 grams of silica per 100 ml. of solution. This was diluted with 775 parts by volume of water and partially neutralized with 767 parts by volume of a sulfuric acid solution containing 30 grams of sulfuric acid in 100 ml. To this mixture was added 61 parts by weight of Dowfax 2A1 (45% active) as a wetting agent. The solution had a pH of 0.58 and a gel time of 15–20 hours.

The sodium-free tetraethanolammonium silicate was prepared as described in copending patent application Serial No. 131,490. 16,660 parts by weight of Ludox HS silica sol containing 5000 parts by weight of silica were treated with 500 parts by weight of aqueous ammonia (29% $NH_3$) and 1388 parts by weight of ethylene oxide. After the reaction was complete, water was distilled off to a concentration of 40 grams of $SiO_2$ per 100 ml. This solution of tetraethanolammonium silicate had a density of 1.33 grams per ml. and a mol ratio of quarternary ion:$SiO_2$ of 1:9.65.

A primary investment slurry was prepared using 6 quarts of the binder solution just described, 22 pounds of −325 mesh silica flour and 11 pounds of −140 mesh silica flour. 3 ounces of pigment grade $Fe_2O_3$ were also included. This slurry had a viscosity of about 70 seconds using a No. 4 Zahn cup viscosity.

Wax pattern trees, as "set ups," which had been previously assembled, were dipped in the slurry and dusted with silica and allowed to dry. The viscosity of the slurry was reduced by adding three-fourths of a quart of the binder solution, resulting in a No. 4 Zahn cup viscosity of about 22.5 seconds. After one of the trees had dried in the air, it was dipped a second time and then both trees were invested with secondary investment on a vibrating table, after the coating had dried for four hours. The invested patterns were heated in the casting oven for 17 hours to a temperature of about 727° C. The wax patterns were thus melted out and castings of ferrous alloy were subsequently poured.

The dimensions of the wax patterns and the final castings were compared. Thirteen different measurements on seven castings showed one measurement with a maximum difference of −0.005 inch and one with a minimum of zero, with an average deviation of only 0.0025 inch. Nine of the thirteen measurements varied between 0 and 0.003 inch.

It was considered that the castings formed with this binder were satisfactory for regular plant production.

*Example 3*

A further precoat and molding plant test was carried out using an alkaline tetraethanolammonium silicate solution prepared as described above. It had a concentration of 40 grams of $SiO_2$ per 100 ml. at a density of 1.33 grams/ml. with a mol ratio of 1 quaternary ion to 9.83 $SiO_2$. This was diluted to a solution containing 30 grams of $SiO_2$/100 ml. and enough $H_2SO_4$ to give a pH of 9.8. That is, 5250 ml. of the tetraethanolammonium silicate solution just described was diluted with 1600 ml. of $H_2O$ and neutralized with 170 ml. of a 30% sulfuric acid solution.

A primary investment slurry was prepared using 6.5 quarts of the above binder solution, 23 lbs. of −325 mesh silica flour, 11.5 lbs. of −140 mesh silica flour and 650 drops of Dowfax-2A1. The slurry had a No. 4 Zahn cup viscosity of 123 seconds. Dowfax-2A1 was obtained from Dow Chemical Co. and is a sodium salt of disulfonated dodecyldiphenyl oxide.

Since the wetting did not seem to be complete at the sharp edges and corners, another 150 drops of Dowfax-2A1 was added and another pattern was dipped and stuccoed, as above.

Finally, a total of 0.5% of the Dowfax-2A1 wetting agent was added, and the slurry was further diluted with another 0.75 quarts of the binder solution. This slurry had a No. 4 Zahn cup viscosity of 27 seconds and was used for a second dipping of the two trees which had already been dipped once. The second dipping occurred after a drying period of 4 hours and the trees were then invested and cast in the usual manner.

*Example 4*

A sodium-free tetraethanolammonium silicate solution was prepared from the same components as before. It had a mol ratio of 1 quaternary ammonuim ion:10.09 $SiO_2$ and a concentration of 40 grams of $SiO_2$/100 ml. (31.7% $SiO_2$). This was adjusted with water and 30% $H_2SO_4$ to give a binder solution containing 30 grams of $SiO_2$/100 ml. having a pH of 9.8.

A primary investment slurry was prepared using 1080 ml. of the above binder solution, 6.5 ml. of Ultrawet 60 L and 4.0 ml. of n-octanol. Ultrawet 60 L was obtained from Atlantic Refining Co. and is a triethanolamine salt of dodecylphenyl-sulfonic acid. It is a 60% active solution in water. n-Octanol is a 100% active clear liquid.

To 886 ml. of this binder solution containing the Ultrawet and n-octanol were added 1266 grams of −325 mesh silica flour, 633 grams of −140 mesh silica flour with 11.8 grams of pigment grade $Fe_2O_3$. The resulting slurry had a viscosity of 48 poises. The wax pattern coated very well without foaming. This slurry was then diluted down to a second dipping viscosity of 4.15 poises by adding a further 125 ml. of the binder solution. This was agitated vigorously for four hours without forming foam.

A further binder solution was prepared using 6750 parts by volume of the tetraethanolammonium silicate solution just described, having a mol ratio of $SiO_2$/quaternary ion of 10.09. This was diluted with 2050 parts by volume of water, 200 parts by volume of a 30% sulfuric acid solution and 55 parts by volume of Ultrawet 60 L (0.61% by volume). This binder was used to prepare a primary investment slurry having the following composition:

6 quarts 2 ozs. of the above binder solution
18.4 pounds of −325 mesh silica flour
9.2 pounds of −140 mesh silica flour
3 ozs. of pigment grade $Fe_2O_3$
21.6 ml. of n-octanol (anti-foamer; 0.37%)

The final slurry had a No. 4 Zahn cup viscosity of 61.8 seconds and was agitated for 30 minutes without forming a foam or suds. Five set-ups were dipped and stuccoed. The patterns were both wax and polystyrene, and both were coated very well without any difficulty. This slurry was then diluted down with 20 ounces of the binder solution and 3.1 ml. of octanol giving a No. 4 Zahn cup viscosity of 22.5 seconds. Two additional set-ups of different patterns were dipped in this slurry without difficulty.

Then 12 more ounces of the binder solution with 1 ml. of octanol were added to give a final slurry having a No. 4 Zahn cup viscosity of 15.5 seconds. This did not suds and gave a very satisfactory second coating after the first coating had been dried for four hours. After drying over night, these coated patterns were invested.

The castings obtained from these molds were found to exhibit buckling, indicating that the first coating had been penetrated by the following coatings, but otherwise were very good.

*Example 5*

The following materials were used in a series of tests to develop a mixture for a precoat which would avoid buckling and penetration or other difficulties:

Green pattern wax #1003 from Yates Manufacturing Co., Chicago, Illinois
Morgan −325 mesh silica from Pennsylvania Pulverizing Co., Pittsburgh, Pennsylvania Morgan —140 mesh silica from Pennsylvania Pulverizing Co., Pittsburgh, Pennsylvania Wedron Sand from Wedron Silica Co., Wedron, Illinois Aluminum Alloy #43 Special from George Sall Metals Co., Inc., Philadelphia, Pennsylvania

711 Investment (for backup of precoat) from Ransom & Randolph Co., Toledo, Ohio The basic binder solution was:

775.0 ml. of tetraethanolammonium silicate solution (40 grams $SiO_2$/100 ml.)
(10.09 mol $SiO_2$:quaternary ion ratio)
236.0 ml. of water
19.6 ml. of $H_2SO_4$ (30% concentration)
6.3 ml. of Ultrawet 60 L
pH 9.78

From this was formed a primary investment slurry for the precoat, or first dipping solution, made up of:

868.0 ml. of the binder solution
1346.0 g. of —325 mesh silica flour
673.0 g. of —140 mesh silica flour
3.3 grams of n-octanol
Viscosity 138 poises This slurry was agitated for one hour and was used to precoat two patterns made from the above wax. These patterns were 2 x 2 x 1 inch plates on a 2-inch stem and had been washed in acetone before dipping. After dipping, they were stuccoed in a fluidized bed of Wedron sand and the coating was dried in the laboratory atmosphere for four hours after which the patterns were dipped in a diluted dipping slurry made up by adding to said first dipping solution:

162.0 ml. of binder solution
0.7 ml. of the n-octanol
Viscosity 295 cp.

After the second dipping, the patterns were stuccoed in the fluidized Wedron sand and then dried over night in the laboratory atmosphere, after which they were invested with secondary investment material (#711) in steel flasks. The investment was made up of 1000 g. of #711 investment plus 180 ml. of water. It was agitated by hand for two minutes and then poured around the coated pattern in the flask and settled by vacuum plus slight shaking for five minutes. The vacuum was less than 100 mm. of Hg. The secondary investment was allowed to set for four hours and the wax was melted out over night in an oven at 100° C. after which the molds were placed in a kiln preheated at 121° C. and the temperature was increased slowly to 927° C. over a period of five years. Molten aluminum at 815° C. was then poured into the molds and allowed to cool to room temperature over night. The next morning the castings were found to be badly pitted and buckled. Following this, baked (but not cast) molds, which had been baked but had not been used for pouring metal, were removed carefully from the flasks and cut in half with a hacksaw so that the condition of the primary coating could be inspected. It was found that the primary coating had many defects as it had cracked and the secondary investment material had run under it.

A new binder solution was prepared exactly as above except that the wetting agent was changed. In addition to the Ultrawet 60 L (60% active) the following wetting agents were used:

Aerosol OS: Sodium isopropyl naphthalene sulfonate, is a powder containing 75% active ingredient with 21% of sodium sulfate, about 3.5% of free oil and about 2.5% of moisture.

Aerosol AY: Sodium diamyl sulfosuccinate, 100% active waxy solid.

Aerosol OT-75%: Sodium dioctyl sulfosuccinate, a solution containing 75% active ingredient, and the remainder water plus 5% of a lower alcohol.

Dowfax 2A1: Sodium salt of disulfonated dodecyl diphenyl oxide (45% active solution).

Tests with these materials showed that the addition of a wetting agent decreases the bond in molded sand specimens very strongly. However, the addition of n-octanol increases the strength of the bond so that it can restore a large portion of the strength lost by the addition of the wetting agent. Thus when no wetting agent was used, and 0.3 ml. of octanol was used with the binder, the compression strength in p.s.i. after curing first at 60° C. and later at 927° C. was 76.5 p.s.i. If 0.45 ml. of Ultrawet 60 L was used, the strength decreased to 53.2 p.s.i., whereas if the Ultrawet 60 L was used without the defoamer, n-octanol, the strength was only 15.8 p.s.i. With 0.74 ml. of Aerosol OT-75, without defoamer, the strength was 8.3 p.s.i., whereas when 0.67 ml. of octanol was added the strength increased to 36.3 p.s.i.

It was found, too, that if the defoamer was added to the binder solution before the sand was mixed in, the viscosity of the ensuing slurry was very much reduced, e.g., from about 40,000 cp. to 3550 cp.

A series of molds were prepared using the following formulations:

Basically, the binder solution contained 775.0 ml. of the tetraethanolammonium silicate solution, as above in this example, with 236.0 ml. of water and 19.6 ml. of 30% sulfuric acid. This had a pH of 9.78 and to it was added the wetting agent.

A primary investment slurry for first dipping was made up of:

868.0 ml. of the binder solution
1346.0 grams of —325 mesh silica flour
673.0 grams of —140 mesh silica flour
13.7 grams of iron oxide ($Fe_2O_3$)
3.3 ml. of n-octanol This was considered the standard amount of octanol. In other cases, 2, 3 or 4 times the standard amount of octanol was added. With the standard amount of n-octanol, the viscosity was 13,800 cp. With double the amount, the viscosity was 40,000 cp., if the octanol was added after mixing with the sand, and 3,550 cp. if added earlier. With four times the amount of octanol, the viscosity was 2,100 cp.

The second dipping solution was made up by adding to the first dipping solution 162.0 ml. of binder solution and 0.7 ml. more of n-octanol. Where the octanol was doubled, then 1.4 ml. was used with the second dipping; and where quadrupled, 2.8 ml. of octanol was used. The viscosity varied from 295 cp. with the single portion to 233 with the double portion and 188 cp. with the quadrupled amount of octanol. The viscosity also varied with the amount and type of wetting agent used.

When using Ultrawet 60 L with the normal amount of octanol, the inner mold surface was very badly cracked with much penetration of the secondary investment into the mold. However, when four times the normal amount of octanol was used, there were very few cracks and very little secondary backup material had penetrated into the mold.

Where Aerosol OS was used, or Aerosol AY, with the normal amount of octanol, the results were quite similar to the Ultrawet with the quadrupled amount of octanol.

In the acid type investments, the binder solution had a pH of 0.58. This was obtained by using:

495.0 ml. of tetraethanolammonium silicate solution containing 40 g. $SiO_2$/100 ml. (mol ratio $SiO_2$/quat., 9.29.)
83.2 ml. of $H_2O$
82.3 ml. of 30% sulfuric acid
6.5 ml. of Dowfax 2A1 (45% active) or
4.7 ml. of Ultrawet 60 L (60% active)

The primary investment slurry prepared from the binder solution containing Dowfax 2A1 was made up with:

591.0 ml. of the binder solution
1000 grams of —325 mesh silica flour
500 grams of —140 mesh silica flour
8.5 grams of iron oxide
10.0 ml. of octanol This had a viscosity of 4920 cp.

This second dipping solution was made up by adding to the first dipping slurry:

128.0 ml. of binder solution
2.5 ml. of n-octanol

The first dipping slurry prepared from the binder solution containing Ultrawet 60 L was made up of:

566 ml. of binder solution
1060 grams of —325 mesh silica flour
530 grams of —140 mesh silica flour
8.5 grams of $Fe_2O_3$
10 ml. of n-octanol
Viscosity 1230 cp.

The second dipping slurry was made by adding 78.0 ml. of binder solution and 2.5 ml. of octanol to the first dipping slurry.

The molds made with the acid investments were in both cases nearly perfect with practically no cracks and no secondary investment material penetrating into the mold. The coating was much harder than any of those formed on the alkaline side.

*Example 6*

In the further study of the neutralization of the tetraethanolammonium silicate having a mol ratio of $SiO_2$ to quaternary ion of 9.29, a pH of 11.00, and using a silica concentration of 30 grams of $SiO_2$ per hundred ml. and 5% $H_2SO_4$, we found that the pH reverts in all cases in which the neutralization has not been brought to the point where an increase in viscosity and gel formation occurs within 10 minutes, that is, below a pH of 9.75. Thus those previous bonds formed at a pH of 9.78 converted back to a pH of about 10.5 to 10.6 within 24 hours to 100 hours, so that a hard, insoluble binder was not formed on drying.

We have found that in order to prepare a binder solution from tetraethanolammonium silicates or quarternary ammonium silicates in general, which will have an indefinite life and yet form a strong, hard mold coating, it is necessary to neutralize the alkali carefully but avoid neutralizing to a pH at which irreversible gelation will occur. Thus, specifically for tetraethanolammonium silicate containing 49.06% $SiO_2$ with a mol ratio of 9.29 $SiO_2$/quaternary ion, it was found that the pH should first be reduced by 1.2 pH units and then allowed to stand in order for the pH to revert, and then reduce the pH by another 0.25 units. After further storage, this might be further reduced by 0.04 units. Thus to 75 ml. of the tetraethanolammonium silicate diluted to 40 grams of $SiO_2$ per 100 ml. of solution and further diluted with 5 ml. of $H_2O$ and having a pH of 11.00 was added 13.0 ml. of 5% sulfuric acid, thus giving a pH of 9.80 (a reduction of 1.20 pH units). This solution was stored at room temperature for 24 hours after which the pH had increased back to 10.43. On the addition of 2.1 ml. of 5% $H_2SO_4$ the pH was reduced to 10.18 (a reduction of 0.25 pH unit). This solution reverted to 10.32 pH in four hours, and an additional 0.48 ml. of 5% sulfuric acid plus 3.92 ml. of water was added giving a solution with a concentration of 30 grams of $SiO_2$ per 100 ml. and having a pH of 10.28 (a reduction of 0.04 pH unit). This solution did not change in pH on further aging. We call this a "prepolymerized" tetraethanolammonium silicate solution. It is indefinitely stable, sets to a hard, insoluble composition on drying, and forms excellent precoatings on wax or plastic molds.

The advantage of working with pH differences rather than absolute pH figures is that at the high $SiO_2$ concentrations and alkalinities the pH meters change their zero position constantly.

The binder solution was made up as described, and primary investment slurries were prepared with Ultrawet 60 L and Aerosol AY, as follows:

745.0 ml. of binder solution
6.0 ml. of Ultrawet 60 L
8.6 ml. of octanol
1060 grams of —325 mesh silica flour
530 grams of —140 mesh silica flour
10.8 grams of $Fe_2O_3$ (pigment grade)

This had a viscosity of 6600 cp.

The second dipping solution was made by adding:

250.0 ml. of binder solution
1.8 ml. of octanol to the first dipping slurry. The first dipping had a viscosity of 37.5 seconds with the No. 4 Zahn cup, compared to 13.8 for the second dipping.

With Aerosol AY, the following slurries were prepared:

699.9 ml. of binder solution
6.1 ml. of Aerosol AY (30% solution)
10.4 ml. of n-octanol
1060 grams of —325 mesh silica flour
530.0 grams of —140 mesh silica flour
10.8 grams of $Fe_2O_3$ The viscosity was 44 seconds with the No. 4 Zahn cup.

A second dipping slurry was made by mixing 200 ml. of binder solution with 2.4 ml. of octanol added to the first dipping slurry. This gave a viscosity of 11 seconds with a No. 4 Zahn cup. The stuccoing in this case was done by sieving sand over the wet patterns. These precoats were unaffected by soaking in water for over three months.

In the case of the Ultrawet 60 L with a total of three dippings, that is, one primary investment dipping and two secondary dippings with a drying time of four hours between dippings, the resultant mold was very good, showing only very slight cracking and practically no secondary investment penetration into the mold. With Aerosol AY, again the mold coating was very good when tested by sawing the mold in half. The coating was very smooth with almost no cracks and almost no secondary investment penetration. It was found, however, that the Aerosol AY lost its wetting power on standing over night in an alkaline solution. However, when these dipping slurries were tested in the plant scale run it was found that penetration occurred, forming a rough and grainy surface on the casting because of penetration of the hot metal melt into the mold surface. This penetration appears to occur because of a slight over-acidification. We believe that the pre-polymerization has been carried too far, resulting in a weaker bond.

*Example 7*

A further solution of tetraethanolammonium silicate was prepared as before, containing 31.7% of $SiO_2$ and a mol ratio $SiO_2$/quaternary ion of 11.45. This had a pH of 11.19 and was adjusted by decreasing the pH 1.2 pH units, using 921 ml. of 5% sulfuric acid. After aging 18 hours, the pH rose to 10.62, and 500 ml. of water was added in order to provide a concentration of 30 grams of $SiO_2$/100 ml. Molds were prepared as before and castings were made after the mold was heated to 927° C. and then cooled to 330° C. The alloy was cast at a temperature of 665° C. and, as before, the castings buckled. Slurries in the acid range of pH 0.50–1.10 gave very good molds and resultant castings. Using the binder prepolymerized with the preliminary adjustment of 1.20 pH units, tests were made after aging and a secondary adjustment of 0.03 to 0.25 pH units. It was found that at the low pH adjustment (0.03) values buckling is strong, and at the highest pH adjustment values (0.25) penetration is strong. At these higher adjustments there is much stronger rise in pH on aging than in the others, indicating a great difference in the state of the highly acidified and less acidified solution. Using a secondary adjustment of 0.13 pH units, excellent castings were made, showing no penetration or buckling with very good detail and very good surface characteristics. It was found that increasing the viscosity improved the quality and appearance of the castings, and that aging of the slurry did not decrease the quality of the primary coatings. The best pH adjustment is to first lower the pH by 1.20 units followed by a secondary adjustment of 0.13 pH units after aging over night. The best viscosity for these slurries was about 100 seconds by the No. 4 Zahn cup. This was diluted to 14–20 seconds for the second dipping coating. Only two coatings seemed necessary for best results.

A plant test was run using the following materials:

8090 ml. of tetraethanolammonium silicate (40 grams $SiO_2$/100 ml.) (mol ratio $SiO_2$/quaternary ion 9.29)
1355.0 ml. of 1.02 N $H_2SO_4$
1000.0 ml. of $H_2O$
Initial pH 10.80
Final pH 9.60

After aging overnight, an additional 104.0 ml. of 1.02 N $H_2SO_4$ and 240.8 ml. of $H_2O$ was added. The initial pH was 10.42, and final pH was 10.29. To this binder solution containing 30 grams of $SiO_2$/100 ml. was added 87.0 ml. of Ultrawet 60 L.

The first dipping slurry was made with:

6 quarts 6 ozs. of binder solution
65 ml. of n-octanol
18 lbs. of −325 mesh silica flour
9 lbs. of −140 mesh silica flour
3 ozs. of $Fe_2O_3$
Viscosity 80 seconds with No. 4 Zahn cup The second dipping slurry was made by adding 1 quart of binder solution and 14 ml. of octanol to the first dipping slurry, giving a viscosity of 22 seconds by the No. 4 Zahn cup. A drying time of 4 hours was used between coatings, and castings were made with three varieties of stainless steel as well as nearly pure iron. In each case, very fine reproductions were made with no adjustment needed to be made for the different patterns.

*Example 8*

A test of the preparation of shingle coatings was made using tetraethanolammonium silicate with 49.06% $SiO_2$ and a mol ratio of quaternary ion to $SiO_2$ of 1:9.29. This was adjusted to a concentration of 30 grams of $SiO_2$ per 100 ml. and adjusted in pH as in Example 6. That is, the pH was reduced by 1.20 units and then the solution was allowed to age over night. It was again adjusted by 0.25 units and allowed to stand for four hours and, finally, adjusted by 0.04 units.

A series of coating mixtures, as described below, were prepared and brushed on 2.5 x 2.5 inches asbestos cement shingle blanks. These were dried at room temperature. The addition of wetting agent and defoamer is helpful but not necessary. The best coatings were made using a silicate binder solution with 15 grams of $SiO_2$ per 100 ml. and loaded with pigment at the rate of 90% based on the weight of the solids content of the binder solution. After drying at room temperature, one sample was boiled in water for an hour and another for three hours and then soaked for 2½ days. These performance tests correspond to those used in the ceramic coated shingle industry. No pigment was removed and the redried films were as uniform as before but were more dull and pigment could be rubbed off. However, this is a very excellent result after such a severe treatment. When heated above 260° C., no titratable alkalies were found, and only about 1.5% of quaternary ion present is dissolved from the samples dried at room temperature.

These coatings were made up with 17 ml. of the experimental silica and 17 ml. of water, a total of 37 grams. To this was added 6 grams of pigment, either $Fe_2O_3$ or $Cr_2O_3$, and to some samples 0.066 gram of Polyox WSR 35 was added. Also 1 drop of Ultrawet 60 L and 0.5 drop of octanol. As a result, very smooth, uniform coatings were formed without cracks on drying at room temperature. These coatings could not be rubbed off.

*Example 9*

An adhesive solution was prepared from a sodium-free tetraethanolammonium silicate having a silica ratio of 5.44, with a total solids content of 68.27%. The viscosity of 20° C. was 2.33, and the pH was 11.4. After setting at room temperature, B flute single face kraft board bonded with this adhesive had a pin adhesion strength of 43.4 pounds per 12 inches of flute tip. Setting the bond at higher temperatures reduced this as, for instance, at 94° C. the strength was only 37.4 lbs., and at 232° C. the strength was only 8 lbs. per 12 inches of flute tip. In all cases, the wet strength was less than one-half pound.

Another tetraethanolammonium silicate having a mol ratio of 6.89 $SiO_2$/quaternary ion and 50% $SiO_2$ tested in an adhesive formulation also formed a useful bond for plywood.

While the slight amount of foaming which occurs in the second dipping procedures described above produces no weak spots or other problems with castings, it may be avoided completely by omitting the wetting agent in the secondary dip coating. Also, 2-ethyl 1-hexanol may be used as a defoamer rather than the n-octanol. In coating surfaces such as the molds described above, it is recognized that it is essential that the surface be wetted in order to avoid penetration and other ill effects. We have shown that in specific cases, certain wetting agents are better than others. The preferred agents will vary with the surface and the binder solution and should be found by experiment. Where foaming occurs, poor wetting may result and, as we have shown, specific defoamers may be used depending on the binder slurry in use. We have shown that the addition of a wetting agent tends to reduce the strength of the final bond but that the addition of a defoamer restores the strength in large measure. A weak bond permits defects in the casting such as penetration of the coating by the molten metal.

More or less specific claims will be presented hereinafter and even though such claims are rather specific in nature, those skilled in the art to which this invention pertains will recognize that there are obvious equivalents for the specific materials recited therein. Some of the obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. We intend that all such obvious equivalents be encompassed within the scope of this invention and patent grant in accordance with the well-known doctrine of equivalents, as well as changed proportions of the ingredients which do not render the composition unsuitable for the disclosed purposes.

The term "consisting essentially of" as used in the following claims is meant to include compositions containing the named ingredients and any other ingredients which do not destroy the usefulness of the compositions for the purposes stated in the specification.

By "substantially alkali metal free," we mean that a very minor proportion of cation is present as alkali metal, e.g., not more than 1 or 2 weight percent of the binder solution.

What is claimed is:
1. A stable flowable composition consisting essentially of:
   (a) a solid particulate material, and
   (b) a binder component consisting essentially of a substantially alkali metal-free amorphous quaternary ammonium organic silicate characterized by the formula:
   $$X(N_nR_p{}^s)_2O \cdot YSiO_2 \cdot ZH_2O$$
   wherein:
   N represents a nitrogen atom;
   n is a small integer, less than 10, indicating the number of nitrogen atoms;
   X, Y and Z represent numbers defining the relative amounts of each of the component parts of the compound. X is 1, Y is between 0.5 and 20, and Z is between 0 and 99;
   R represents alkyl radicals containing between about 1 and 20 carbon atoms, from 2 to 20 of which are omega hydroxy alkyl groups, from one to four R groups are associated with each N;
   p is between 4 and 4n, indicating total R groups; and
   s is an integer from 1 to p, indicating the number of different types of R groups.

2. A composition according to claim 1 wherein said binder component is utilized in the form of an alkaline solution.

3. A composition according to claim 2 wherein said alkaline solution has a pH within the range of 9.7 to 10.8.

4. A composition according to claim 3 in which the pH has been stabilized by stepwise reduction in steps of about 1.20 pH units and then 0.13 pH units.

5. A composition according to claim 3 in which the pH has been stabilized by stepwise reduction in steps of about 1.20 pH units, then about 0.25 pH units, then about 0.04 pH units.

6. A composition according to claim 1 wherein said binder component is utilized in the form of an acidic solution having a pH within the range of 0.5 to 1.5.

7. A composition according to claim 1 which in addition contains a wetting agent.

8. A composition according to claim 1 which in addition contains a defoaming agent.

9. A composition according to claim 1 which in addition contains both a wetting and a defoaming agent.

10. A stable flowable composition consisting essentially of:
    (a) a solid particulate material, and
    (b) a tetraethanolammonium silicate.

11. A stable flowable composition consisting essentially of:
    (a) a solid particulate material, and
    (b) tetraethanol piperazinium silicate.

12. A stable flowable composition consisting essentially of:
    (a) a solid particulate material, and
    (b) diethanol morpholinium silicate.

13. A stable flowable composition consisting essentially of:
    (a) a solid particulate material, and
    (b) hexaethanolethylene diammonium silicate.

14. A mold comprising the partially dehydrated product of claim 1.

15. A method for prepolymerizing an amorphous quaternary ammonium organic silicate having the formula:
    $$X(N_nR_p{}^s)_2O \cdot YSiO_2 \cdot ZH_2O$$
    wherein:
    N represents a nitrogen atom;
    n is a small integer, less than 10 indicating the number of nitrogen atoms;
    X, Y and Z represent numbers defining the relative amounts of each of the component parts of the compound;
    X is 1, Y is between 0.5 and 20, and Z is between 0 and 99;
    R represents alkyl radicals containing between about 1 and 20 carbon atoms, from 2 to 20 of which are omega hydroxy alkyl groups up to four R groups are associated with each N;
    p is between 4 and 4n, indicating total R groups, and
    s is an integer from 1 to p, indicating the number of different types of R groups;
    which comprises forming a water solution of the above quaternary organic silicate and reducing the pH of said solution in progressive stepwise stages.

16. A method according to claim 15 wherein said stepwise changes include a first reduction of about 1.20 pH units and then a second reduction of about 0.13 units.

17. A method according to claim 15 wherein said stepwise changes include a second reduction of about 0.25 pH units and an additional third reduction of about 0.04 pH units.

References Cited by the Examiner
UNITED STATES PATENTS

| | | | |
|---|---|---|---|
| 2,058,844 | 10/1936 | Vaughn | 106—38.2 |
| 2,660,538 | 11/1953 | Emblem et al. | 106—287 |
| 2,689,245 | 9/1954 | Merrill | 106—287 XR |
| 2,806,270 | 9/1957 | Shaul | 106—38.35 XR |
| 2,848,338 | 8/1958 | Johnson | 106—38.2 |
| 2,928,858 | 3/1960 | Morehouse | 260—448.8 |
| 2,930,809 | 3/1960 | Jex et al. | 260—448.8 |
| 2,943,103 | 6/1960 | Jex et al. | 106—287 XR |
| 3,024,125 | 3/1962 | Lee | 106—38.35 XR |
| 3,112,538 | 12/1963 | Emblem | 106—38.35 XR |

ALEXANDER H. BRODMERKEL, *Primary Examiner.*
MORRIS LIEBMAN, *Examiner.*